(12) United States Patent
Lickfelt

(10) Patent No.: US 12,472,872 B2
(45) Date of Patent: Nov. 18, 2025

(54) SQUAT-RESPONSIVE MIRROR AND SEAT CONTROL FOR A VEHICLE

(71) Applicant: Honda Motor Co., Ltd., Tokyo (JP)

(72) Inventor: Brian Karl Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 18/425,983

(22) Filed: Jan. 29, 2024

(65) Prior Publication Data

US 2025/0242755 A1    Jul. 31, 2025

(51) Int. Cl.
*B60R 1/072*    (2006.01)
*B60N 2/02*     (2006.01)
*B60N 2/10*     (2006.01)

(52) U.S. Cl.
CPC ............ *B60R 1/072* (2013.01); *B60N 2/0237* (2023.08); *B60N 2/0248* (2013.01); *B60N 2/0278* (2023.08); *B60N 2/10* (2013.01)

(58) Field of Classification Search
CPC .... B60R 1/072; B60N 2/0278; B60N 2/0237; B60N 2/0248; B60N 2/10
USPC .......................................................... 701/49
See application file for complete search history.

(56) References Cited

U.S. PATENT DOCUMENTS

| | | |
|---|---|---|
| 6,663,268 B1 | 12/2003 | Toda et al. |
| 7,086,763 B2 | 8/2006 | Okumura et al. |
| 8,103,414 B2 | 1/2012 | Boss et al. |
| 9,908,458 B2 | 3/2018 | Higgins et al. |
| 10,703,279 B2 | 7/2020 | Dupuis et al. |
| 11,247,610 B2 | 2/2022 | Carpenter |
| 11,305,694 B2 | 4/2022 | Pomish et al. |
| 2006/0290102 A1* | 12/2006 | VanBuskirk, Jr. ........ B60D 1/58 280/511 |
| 2012/0162797 A1* | 6/2012 | Luo ........................ B60R 1/025 359/843 |
| 2019/0139286 A1* | 5/2019 | Shimoda .............. B60K 35/211 |
| 2019/0366930 A1* | 12/2019 | Valladares Meza .... B60R 1/072 |
| 2020/0189468 A1* | 6/2020 | Lee ......................... B60R 1/072 |
| 2020/0346581 A1 | 11/2020 | Lawson et al. |
| 2021/0129754 A1* | 5/2021 | Pomish ................... B60R 1/003 |
| 2021/0245660 A1 | 8/2021 | Lavoie et al. |
| 2021/0291832 A1 | 9/2021 | Simmons et al. |

(Continued)

FOREIGN PATENT DOCUMENTS

| | | | | |
|---|---|---|---|---|
| EP | 1088700 A2 * | 4/2001 | ............ | B60Q 1/115 |
| EP | 3466754 B1 | 12/2019 | | |

*Primary Examiner* — Peter D Nolan
*Assistant Examiner* — Hyang Ahn
(74) *Attorney, Agent, or Firm* — Suzanne Gagnon; American Honda Motor Co., Inc.

(57) ABSTRACT

A system and method for a squat-responsive mirror and seat control for a vehicle is provided. The system includes a control circuitry configured to receive, from a sensor system, sensor information indicative of a squat condition of the vehicle. The squat condition is caused by a load on a towed trailer coupled to the vehicle. The control circuitry further determines a first position of a mirror assembly or a seat assembly of the vehicle. Based on the sensor information, the control circuitry determines an offset by which the mirror assembly or the seat assembly is to be moved with reference to the first position. Further, the control circuitry controls a movement of at least one of the mirror assembly or the seat assembly from the first position to a second position that is different from the first position.

20 Claims, 6 Drawing Sheets

(56) References Cited

U.S. PATENT DOCUMENTS

2023/0339396 A1* 10/2023 Milewski ................ B60R 1/006
2023/0339455 A1* 10/2023 Weston ................ B60W 40/114

* cited by examiner

SQUAT-RESPONSIVE MIRROR AND SEAT CONTROL FOR A VEHICLE

BACKGROUND

Towing trailers can significantly alter a vehicle's dynamics, causing squat—the downward compression of the rear suspension due to the added weight. Existing vehicles often lack mechanisms to address the impact of squat on driver visibility and comfort. In particular, the conventional side mirrors may lose effectiveness and the driver's seating position may become suboptimal, leading to potential safety issues.

Further limitations and disadvantages of conventional and traditional approaches will become apparent to one of skill in the art, through comparison of described systems with few aspects of the present disclosure, as set forth in the remainder of the present application and with reference to the drawings.

SUMMARY

According to an embodiment of the disclosure, a system for a vehicle may be provided for adjusting vehicle systems based on trailer towing. The system may include a control circuitry that may be communicatively coupled to a sensor system of the vehicle. The control circuitry may be configured to receive, from the sensor system, sensor information, which may be indicative of a squat condition of the vehicle, caused by a load on a towed trailer that may be coupled to the vehicle. The control circuitry may further determine a first position of a mirror assembly, or a seat assembly of the vehicle. Based on the sensor information, the control circuitry may determine, an offset by which the mirror assembly or the seat assembly may be moved with reference to the first position. Further, the control circuitry may control a movement of at least one of the mirror assembly or the seat assembly, to a second position that may be different from the first position.

According to another embodiment of the disclosure, a method may be provided for adjusting vehicle systems based on trailer towing. The method including a system may further include a control circuitry that may be communicatively coupled to a sensor system of a vehicle. The method may include receiving, from the sensor system, sensor information, which may be indicative of a squat condition of the vehicle, caused by a load on a towed trailer that may be coupled to the vehicle. The method may include determining a first position of a mirror assembly or a seat assembly of the vehicle. The method further includes determining, based on the sensor information, an offset by which the mirror assembly or the seat assembly may be moved with reference to the first position. Further, the method may include controlling based on the offset, a movement of at least one of the mirror assembly or the seat assembly to a second position that may be different from the first position.

According to another embodiment of the disclosure, a non-transitory computer-readable medium is provided. The non-transitory computer-readable medium may have stored thereon computer-implemented instructions that when executed by a system associated with a vehicle, cause the system to execute operations. The operations may include receiving, from a sensor system of the vehicle, sensor information indicative of a squat condition of the vehicle, caused by a load on a towed trailer that may be coupled to the vehicle, determining a first position of a mirror assembly or a seat assembly of the vehicle. The operations may further include determining, based on the sensor information, an offset by which the mirror assembly or the seat assembly may be moved with reference to the first position. Further, the operations may include controlling, based on the offset, a movement of at least one of the mirror assembly or the seat assembly to a second position that may be different from the first position.

Figure 1:
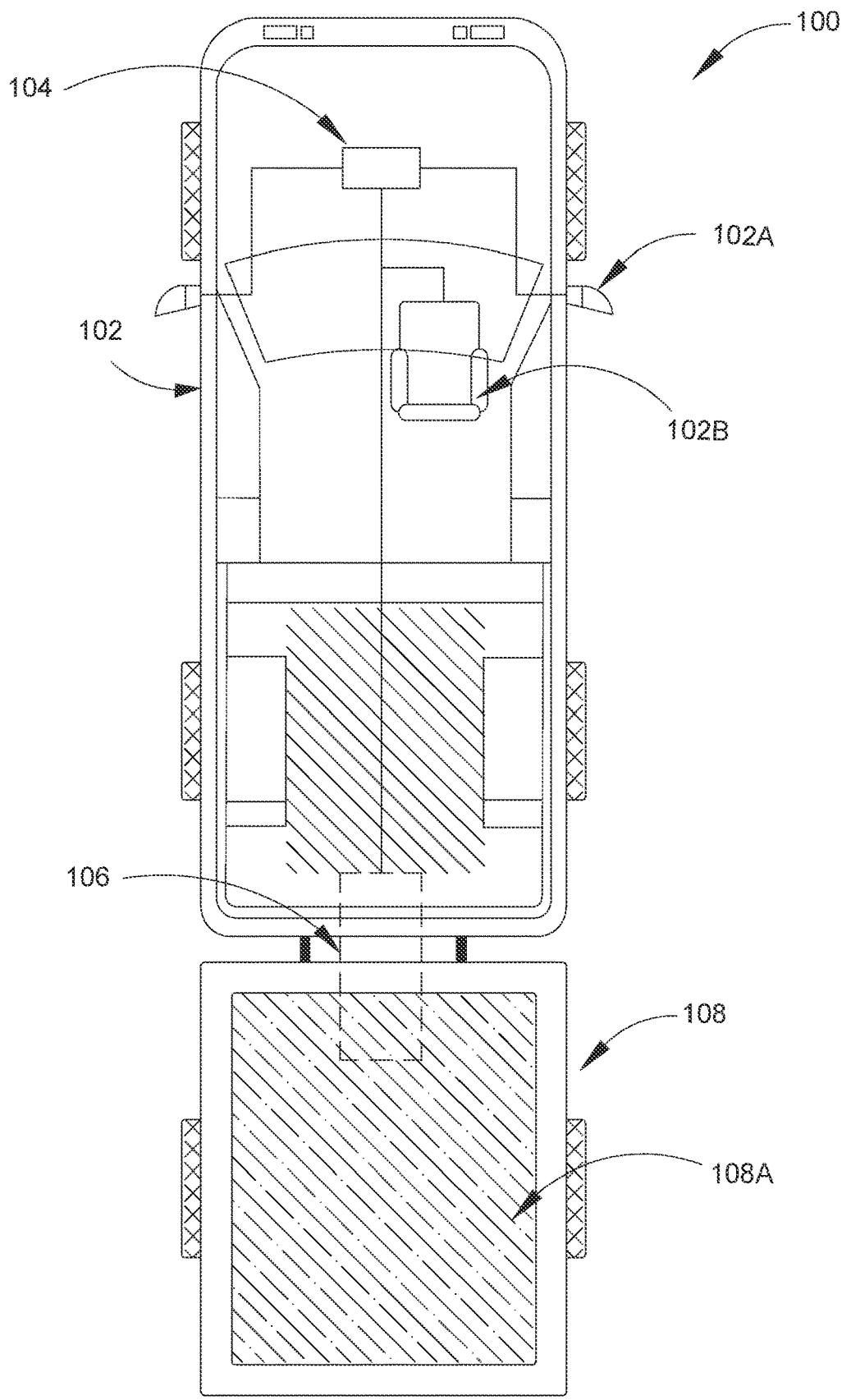
FIG. 1 is a diagram that illustrates an exemplary environment for squat-responsive mirror and seat control for a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Various embodiments of the present disclosure may be found in a system for a vehicle. The disclosed system includes control circuitry that may be communicatively coupled to a sensor system of the vehicle. The control circuitry may be configured to receive, via the sensor system, sensor information that may capture a squat condition of the vehicle. The squat condition of the vehicle may be caused due to a load on a towed trailer coupled to the vehicle. The squat condition may be indicative of at least one of a value of angular displacement of the vehicle from a front portion to a rear portion of the vehicle, or a value of linear displacement of a bottom portion associated with the rear portion of the vehicle from a road surface. The control circuitry may further be configured to determine a first position of a mirror assembly, or a seat assembly associated with the vehicle. Based on the sensor information, the control circuitry may determine an offset by which the mirror assembly or the seat assembly may be moved with reference to the first position. The offset may include an offset angle and a direction of rotation of the mirror assembly or the seat assembly. Thereafter, the control circuitry may control a movement of at least one of the mirror assembly or the seat assembly to a second position that may be different from the first position.

Traditionally, when an in-vehicle integrated system for adjusting a vehicle system (for example, the mirror assembly or the seat assembly) switches from a towing mode to a no-towing mode, the mirror assembly may remain extended as per the towing mode and the seat assembly may remain in a position as per the towing mode. Henceforth, a driver may have to adjust the mirror assembly or the seat assembly, every time, they operate the vehicle. For example, if the driver is driving the vehicle towing a trailer, the in-vehicle integrated system may adjust the mirror assembly or the seat assembly to an adjusted position "A" that suits the driver. Further, when the trailer is detached from the vehicle, the mirror assembly or the seat assembly may remain in the adjusted position "A", and the driver may have to manually adjust the mirror assembly or the seat assembly from the adjusted position "A" to a default position which may be different from the adjusted position "A".

In contrast, the proposed system utilizes sensors strategically placed within the vehicle (e.g., in vehicle's suspension) to detect changes in squat caused by the addition of a trailer. The sensors may feed real-time data to the system, which, in turn, may trigger adjustments in the vehicle's mirror angles and seat positioning. The mirror adjustments may be designed to compensate for altered sightlines caused by squat, ensuring the driver maintains a clear view of surrounding traffic and potential blind spots. Optionally, the seat adjustment feature may be provided to optimize the driver's ergonomic position, considering the changes in weight distribution caused by the trailer. This not only enhances driving comfort but also contributes to better control and maneuverability of the towed vehicle. Furthermore, the system may be personalized through user preferences stored in the vehicle's control interface. Drivers may preset their preferred mirror angles and seating positions for towing scenarios, allowing for a seamless transition between regular driving and towing modes.

The proposed system is designed to enhance safety and convenience when towing trailers and is particularly focused on automatically adjusting the mirrors and seats of a vehicle in response to changes in vehicle squat induced by the weight of a trailer. By dynamically adapting to varying loads, this system aims to optimize the driver's field of vision and seating comfort, ultimately improving overall driving experience and safety during towing.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an exemplary environment for squat-responsive mirror and seat control for a vehicle, in accordance with an embodiment of the disclosure. With reference to the FIG. 1, there is shown a diagram that includes an environment 100. The environment 100 may include a vehicle 102 and a control system 104 that may be communicatively coupled to a sensor system 106 of the vehicle 102 and a least one of a mirror assembly 102A and a seat assembly 102B. The environment 100 may further include a trailer 108 that may be coupled with the vehicle 102 and towed by the vehicle 102. The towed trailer 108 may include a load 108A that leads to a squat condition of the vehicle 102.

The vehicle 102 may be a non-autonomous vehicle, a semi-autonomous vehicle, or a fully autonomous vehicle, for example, as defined by National Highway Traffic Safety Administration (NHTSA). Examples of the vehicle 102 may include, but are not limited to, a three-wheeler vehicle, a four-wheeler vehicle, a hybrid vehicle, or a vehicle with autonomous drive capability that uses one or more distinct renewable or non-renewable power sources. The vehicle 102 may use renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 102 may have load carrying capabilities that uses one or more distinct trailers. It should be noted here that the vehicle 102 shown in FIG. 1 is a four-wheeler vehicle, which is merely an example. The present disclosure may be applicable to other types of vehicles (for example, trucks, tow truck, and the like). The description of such types of the vehicle 102 has been omitted from the disclosure for the sake of brevity.

The mirror assembly 102A may include side mirrors placed on an exterior of the vehicle 102, preferably on lateral sides of the vehicle 102. The mirror assembly 102A may further include a movable portion that includes a mirror housing and a non-movable portion which includes a mirror mount. The mirror assembly 102A may further include an actuator that may be operable to pivot the mirror housing relative to the mirror mount. The actuator may be operable to place the mirror mount in between an operable position and a folded position. In accordance with an embodiment, the mirror assembly 102A may be placed on the exterior of the vehicle 102 for a purpose of helping an operator (for example, a driver or an user) to see areas behind and to both the sides of the vehicle 102, preferably outside the operator's peripheral vision (termed as "blind spot"). The mirror assembly 102A may improve the operator's driving experience by enhancing visibility of a rear portion and a side portion of the vehicle 102, especially, during cornering, turning, acceleration or braking of the vehicle 102.

The seat assembly 102B may include a bucket seat or a bench seat with a contoured platform that can seat one or more people. The bucket seat or a bench seat may typically have rounded backs and may offer a variety of adjustments to fit different sized persons. The seat assembly 102B may further include a seat structure comprising a plurality of components, such as but not limited to, a pair of bracket headset holder, a head rest panel, a front panel cushion, a side frame front panel, a rear frame cushion, a top panel cushion, brackets, a regular level, or a slide adjuster. In accordance with an embodiment, the seat assembly 102B may be placed in a front cabin space of a vehicle for a purpose of adjusting seating position of the operator (for example, a driver or a user), preferably a head of the operator while driving the vehicle 102. In a preferred embodiment, the slide adjuster may be configured to move the front panel cushion horizontally to allows the operator to move towards and away from a dashboard of the vehicle 102, and the pair of bracket headset holder to orient the head rest panel to adjust the head of the operator, based on the seating position. In another embodiment, the seat assembly 102B may be adjusted individually or in combination with the mirror assembly 102A to ensure enhanced visibility of the rear and side portions of the vehicle 102.

The sensor system 106 may include suitable logic, circuitry, and interfaces that may be communicatively coupled with the control system 104 of the vehicle 102 and may be configured to receive sensor information. By way of example, and not limitation, the sensor system 106 may include a stroke sensor and/or a camera (shown in FIG. 3) to acquire the sensor information. In accordance with an embodiment, the sensor information may be extracted from On-Board Diagnostics (OBD) data of the vehicle 102. The sensor information may be indicative of a squat condition of the vehicle 102, which may be caused by the load 108A on the towed trailer 108.

The towed trailer 108 is a vehicle that is to be towed behind another vehicle, such as a vehicle 102. The towed trailer 108 typically has its own set of wheels and can be used to transport a variety of items. For example, towed trailer 108, may be a flatbed or container on wheels that may be used to transport items (such as goods, equipment, or heavy cargo) from one destination to another. The towed trailer 108 may further be a nonoperating vehicle, used to pull a breakdown vehicle or an improperly parked vehicle, and to recover a vehicle damaged in an accident. The towed trailer 108 may be of several types (for example, a boom, a wheel lift, a self-loader, a quick pick, a flatbed, or a lift flatbed), usually based on a type or a size of the vehicle 102. The towed trailer 108 may be coupled with the vehicle 102 using at least one of a rope, a chain, a bar, a drawbar, or a trailer hitch and may be available in varied size and type to match a tongue of the towed trailer 108. In a preferred embodiment, the towed trailer 108 may preferably be used for carrying the load 108A.

The load 108A may include at least one of a cargo load, a suspension load, a chassis load, a container load, a trailer load, or a combination thereof. The load 108A may cause the squat condition in the towed trailer 108 while the towed trailer 108 is coupled with the vehicle 102. By way of example, and not limitation, if the load 108A corresponds a value of 1000 pounds, then the squat condition may be evaluated to a value of 125 centimeters (for example, if the squat condition is measured in terms of linear displacement).

In operation, the control system 104 may be configured to receive the sensor information associated with the vehicle 102. The sensor information may be received from the sensor system. The sensor information may be indicative of the squat condition of the vehicle 102, caused by the load 108A on the towed trailer 108 that may be coupled to the vehicle 102. By way of example, and not limitation, the sensor information may include a value of angular displacement of the vehicle 102 measured with respect to a plane (not shown) substantially parallel to a road surface (shown in FIG. 2A), or a value of substantially vertical distance between the vehicle 102 and the road surface. In an exemplary embodiment, the value of angular displacement may correspond to a level of squat condition that may be caused by the load 108A on the towed trailer 108. Additionally, or alternatively, raw sensor information from the sensor system 106 may be processed using suitable data processing algorithms to extract the sensor information that is provided to the control system 104. For example, the value of angular displacement in the raw sensor information may be processed to extract the level of squat condition of the vehicle 102. By way of example, and not limitation, cameras (as shown in FIG. 3) may capture multiple images of the towed trailer 108 coupled to the vehicle 102. The control system 104 may compute, by using the images, the value of vertical distance between the vehicle 102 and the road surface, or the value of angular displacement measured with respect to the plane substantially parallel to the road surface to determine the level of squat condition, as described, in detail, for example in FIG. 3.

The control system 104 may be configured to process the sensor information to determine a first position (shown in FIG. 2A) of the mirror assembly 102A or the seat assembly 102B of the vehicle 102. The first position of the mirror assembly 102A may correspond to an orientation of the mirror assembly 102A with respect to a plane substantially perpendicular to the road surface, as described, for example, in FIG. 2A. Additionally, or alternatively, the first position of the seat assembly 102B may correspond to an orientation of the seat assembly 102B with respect to a plane substantially parallel to the road surface, as described, for example, in FIG. 2A.

Based on the sensor information, the control system 104 may further determine an offset by which the mirror assembly 102A or the seat assembly 102B may be moved with reference to the first position. The offset may include, for example, an offset angle and a direction of rotation as one of a clockwise direction or a counterclockwise direction. The offset angle may be equal to the value of angular displacement that may be included in the sensor information.

In accordance with an embodiment, the control system 104 may further communicate the offset (e.g., the offset angle and the direction of rotation) to at least one of the mirror assembly 102A or the seat assembly 102B. Based on the offset, the control system 104 may control a movement of at least one of the mirror assembly 102A or the seat assembly 102B to a second position that may be different from the first position. For example, the second position of the mirror assembly 102A or the seat assembly 102B may correspond to a new orientation that may be different from a previous orientation (the first position) of the mirror assembly 102A or the seat assembly 102B. A change from the previous orientation to the new orientation may include an angular displacement (for example, 25 degree) of the mirror assembly 102A or the seat assembly 102B by an offset angle with respect to a plane substantially parallel to the road surface in a particular direction of rotation (for example, a clockwise direction).

Figure 2A:
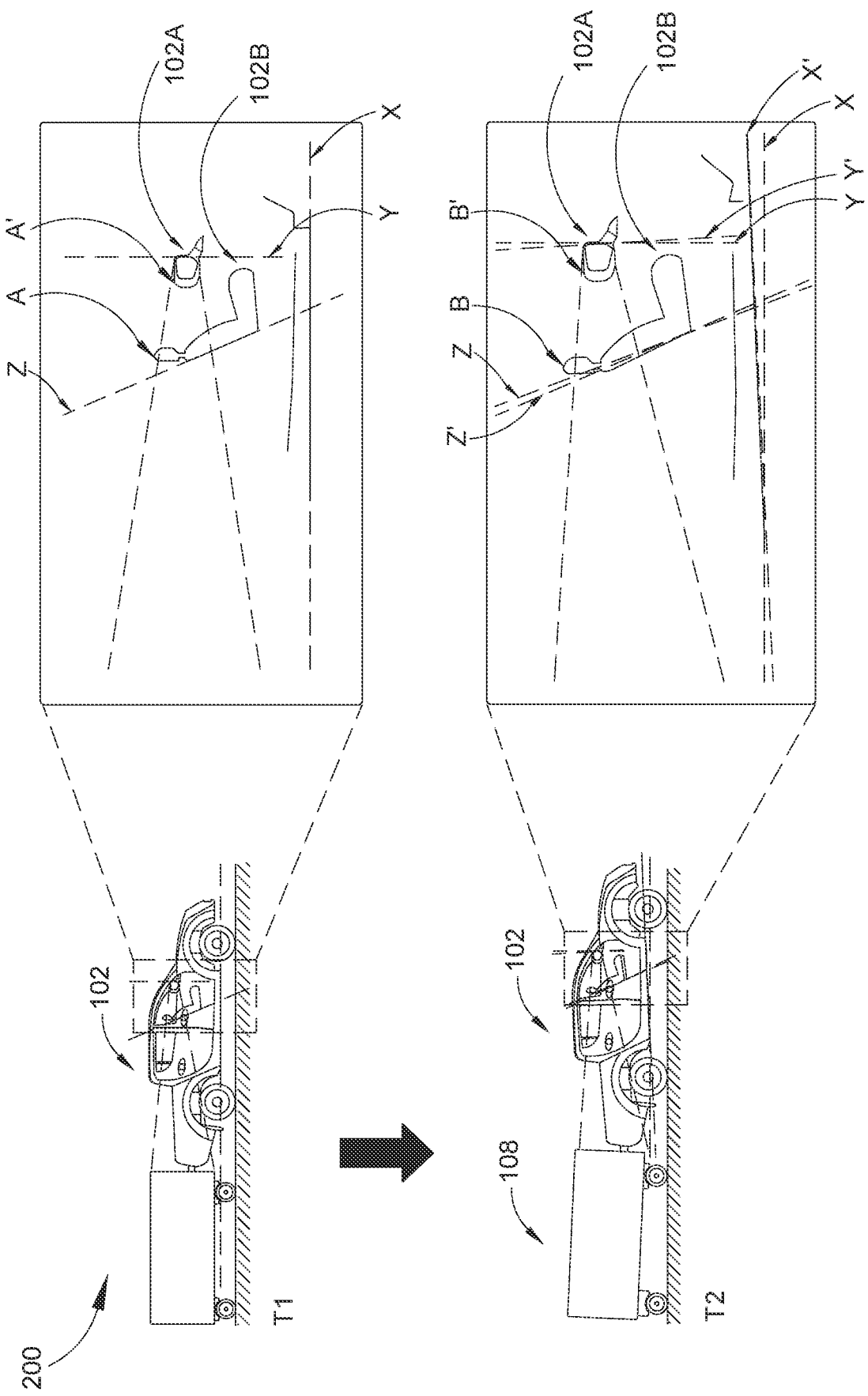
FIG. 2A is a scenario diagram that illustrates a change from a no-squat condition to a squat condition caused by a load on a towed trailer coupled to a vehicle, in accordance with an embodiment of the disclosure.
Figure 3:
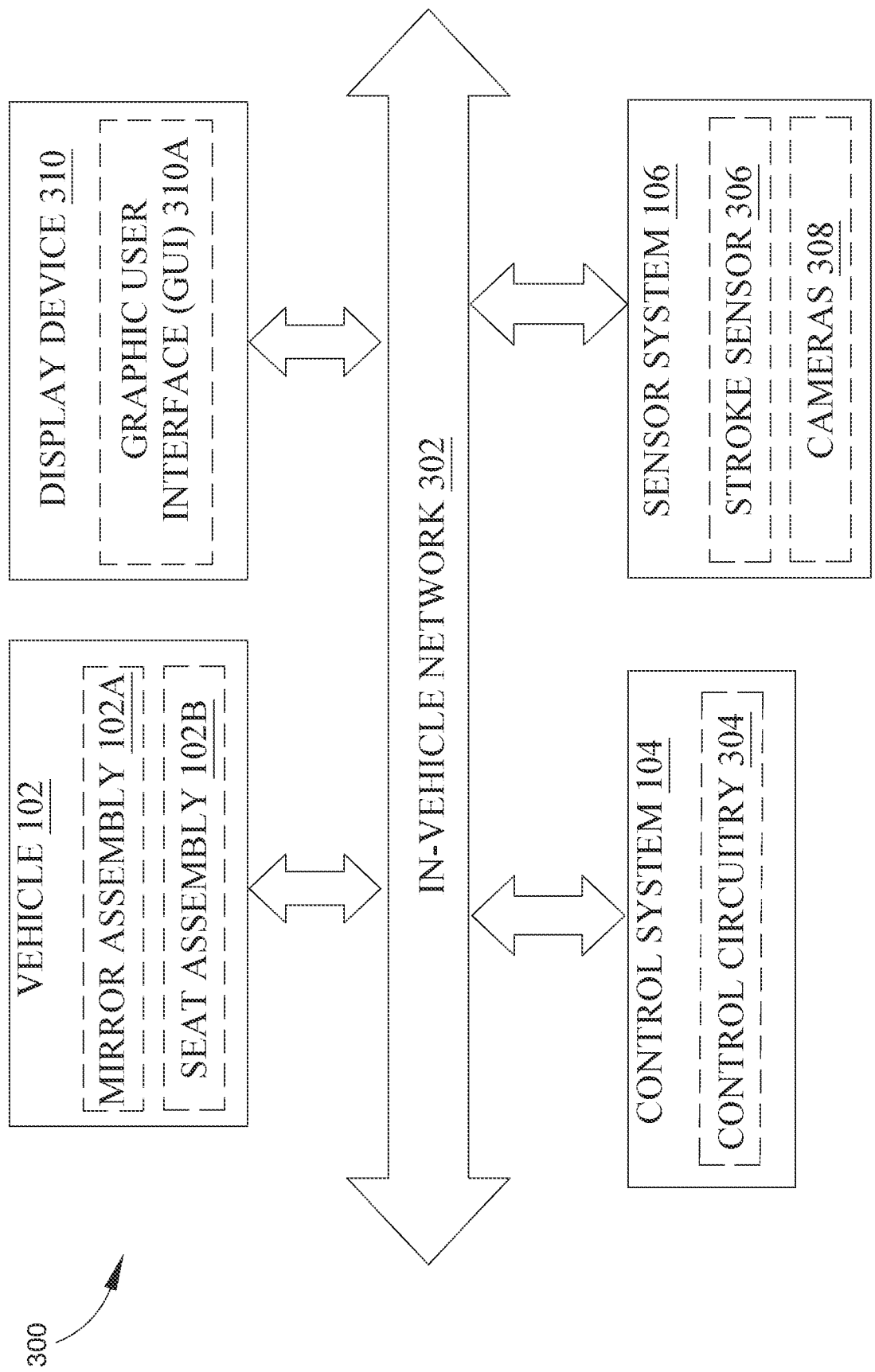
FIG. 3 is a block diagram that illustrates an exemplary system for squat-responsive mirror and seat control for a vehicle, in accordance with an embodiment of the disclosure.

FIG. 2A is a scenario diagram that illustrates a change from a no-squat condition to a squat condition of a vehicle, in accordance with an embodiment of the disclosure. FIG. 2A is explained in conjunction with elements from FIG. 1. With reference to FIG. 2A, there is shown a scenario diagram 200 that includes the towed trailer 108 coupled with the vehicle 102 at a time instant T1 and the towed trailer 108 coupled with the vehicle 102 at a time instant T2. The scenario diagram 200 may further include the mirror assembly 102A and the seat assembly 102B associated with the vehicle 102.

At T1, the towed trailer 108 coupled with the vehicle 102 may experience a no-load condition. The towed trailer 108 coupled with the vehicle 102 may be in a mobile state or a stationary state (e.g., a parked state) for a duration of the no-load condition. In the no-load condition, the towed trailer 108 may be either decoupled from the vehicle 102 or may be coupled to the vehicle 102 without any additional load (such as cargo weight). In case the towed trailer 108 (in the no-load condition) is coupled to the vehicle 102, the vehicle may experience a load (on a rear portion of the vehicle 102) due to a suspension load, a weight of a chassis of the towed trailer 108, a weight of an empty container on the towed trailer 108, or a combination thereof. In some instances, the vehicle 102 may experience a default squat due to the suspension load, the weight of the chassis of the towed trailer 108, and the weight of the empty container on the towed trailer 108. The default squat, if present, may be neglected as it remains with the vehicle 102 in both no-load condition and load condition.

The vehicle 102 may include a bottom portion (not shown), which may be aligned in a horizontal plane in parallel to the road surface, preferably along X axis (as shown). The mirror assembly 102A may be positioned at an initial position A' and may be aligned along Y axis. The Y axis may be substantially perpendicular to the road surface or the X axis. Similarly, the seat assembly 102B may be positioned at an initial position A and may be aligned along a Z axis in a XY plane, which may be substantially perpendicular to the road surface or the XY plane.

At T2, the towed trailer 108 coupled with the vehicle 102 may be in a loaded condition, which may be caused by the load 108A on the towed trailer 108 of the vehicle 102. The load 108A on the towed trailer 108 may cause the vehicle 102 to squat (referred to as a squat condition) at the vehicle's rear portion that is closer to the towed trailer 108. The load 108A may include the cargo load in addition to the load (such as a suspension load, a weight of a chassis of the towed trailer 108, or a weight of an empty container on the towed trailer 108) experienced during the no-load condition. In the squat condition (as shown), the bottom portion of the vehicle 102 may be along the X' axis (due to the load 108A) which may be different from the X axis. The extent by which the bottom portion of the vehicle 102 may shift along the X' axis with respect to the X axis may be referred to as an offset (measured in a counterclockwise direction). Further, in the squat condition, the mirror assembly 102A may be positioned at a first position B' along the Y' axis, which may be different from the Y axis. The extent by which the Y' axis may shift with respect to the Y axis (in the counterclockwise direction) may be equal to the offset. In the squat condition, the seat assembly 102B may be positioned at the first position B, along Z' axis which may be different from the Z axis. The extent by which the Z' axis may shift with respect to the Z (in the counterclockwise direction) may be equal to the offset. In accordance with the embodiment, the first position may be used as a reference for adjusting at least one of the mirror assembly 102A or the seat assembly 102B.

Figure 2B:
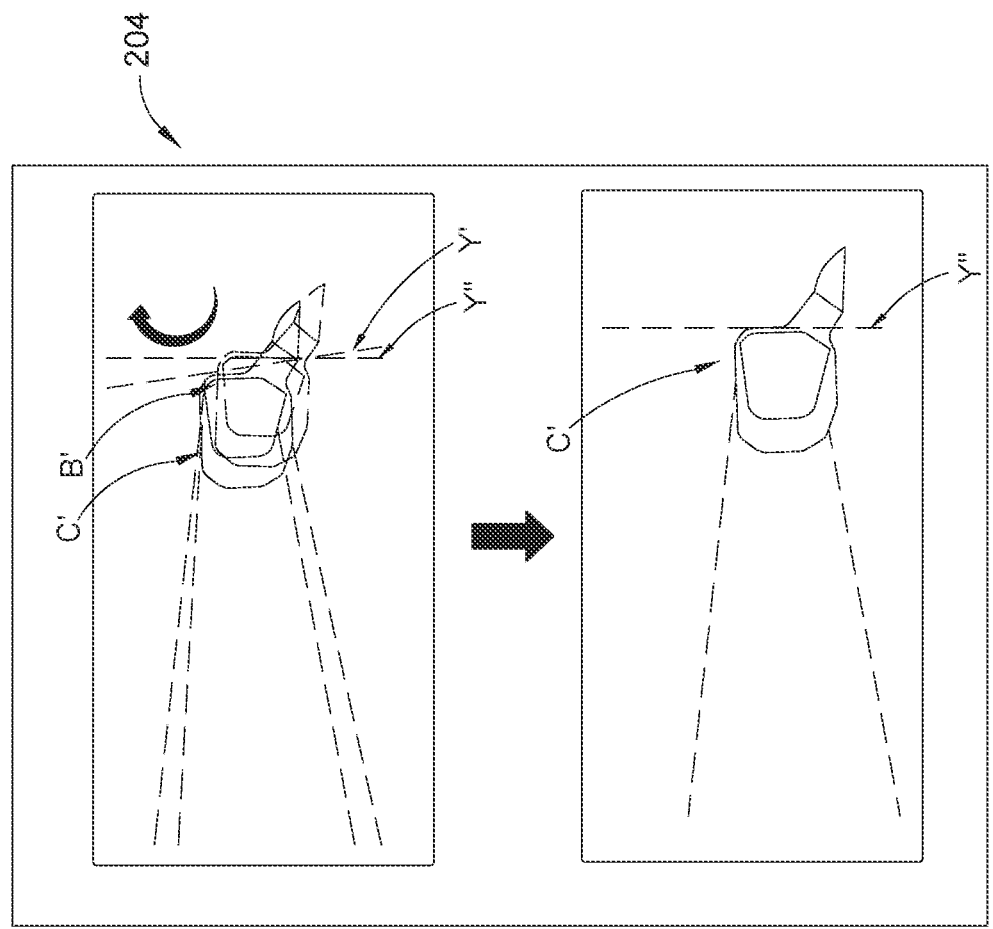
FIG. 2B is a diagram that illustrates an exemplary sequence of operations for a squat-responsive mirror and seat control for a vehicle, in accordance with an embodiment of the disclosure.
Figure 2B:
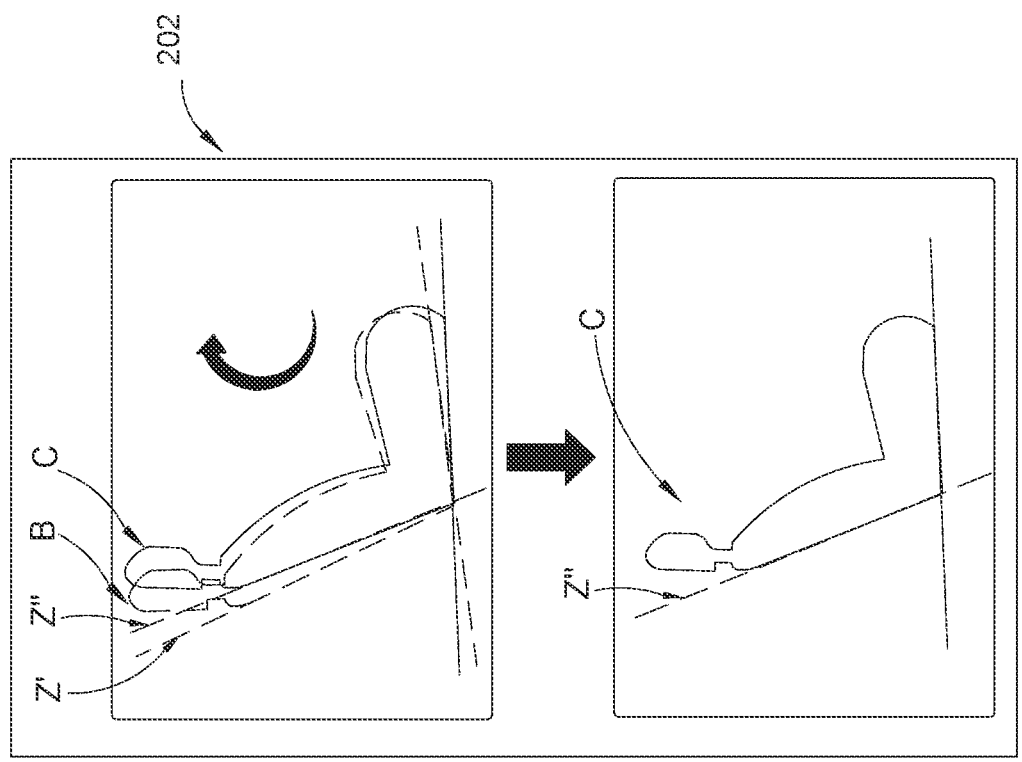

FIG. 2B is a diagram that illustrates an exemplary sequence of operations for a squat-responsive mirror and seat control for a vehicle, in accordance with an embodiment of the disclosure. FIG. 2B is explained in conjunction with elements from FIG. 1 and FIG. 2A. With reference to FIG. 2B, there is shown a sequence of diagrams for adjusting the mirror assembly 102A or the seat assembly 102B.

At 202, the seat assembly 102B may be adjusted. The seat assembly 102B may be positioned at a first position B, in a squat condition, as described, for example, in FIG. 2A. The control system 104 may determine an offset with reference to the first position B. The offset may include an offset angle and a direction of rotation (from Z to Z') of the seat assembly 102B. Based on the determined offset, the control system 104 may control movement of the seat assembly 102B to a second position C, which may be different from the first position B. In an exemplary embodiment, the seat assembly 102B may be positioned along the Z' axis in the first position B. Further, the control system 104, based on the offset, may control movement of the seat assembly 102B to the second position C along a Z" axis, which may be different from the Z' axis. In another exemplary embodiment, the seat assembly 102B may be positioned at the second position C by moving the seat assembly 102B in a clockwise direction. By way of example, and not limitation, while transitioning from the no-load condition to the squat condition, the position of the seat assembly 102B may change from an initial position A along the Z axis (shown in FIG. 2A) to the first position B along the Z' axis due to the squat condition of the vehicle 102. The change may be represented by a value of angular displacement (for example, −25 degree) in the counterclockwise direction, as described, for example, in FIG. 2A. Further, the control system 104 may control movement of the seat assembly 102B from the first position B along the Z' axis to the second position C along the Z" axis by moving the seat assembly 102B by the offset angle (for example: 25 degree) in the clockwise direction.

At 204, the mirror assembly 102A may be adjusted. The mirror assembly 102A may be positioned at a first position B' in the squat condition, as described, for example, in FIG. 2A. The control system 104 may determine the offset with reference to the first position B'. The offset may include the offset angle and the direction of rotation (from Y to Y') of the mirror assembly 102A. Based on the determined offset, the control system 104 may control movement of the mirror assembly 102A positioned in the first position B', to a second position C' which may be different from the first position B'. In an exemplary embodiment, the mirror assembly 102A may be positioned along a Y' axis in the first position B'. Based on the offset, the control system 104 may control movement of the mirror assembly 102A to the second position C' along a Y" axis, which may be different from the Y' axis. In another exemplary embodiment, the mirror assembly 102A may be positioned at the second position C', by moving the mirror assembly 102A in the clockwise direction. By way of example, and not limitation, while transitioning from the no-load condition to the squat condition, the position of the mirror assembly 102A may change from an initial position A' (shown in FIG. 2A) along the Y axis (shown in FIG. 2A) to the first position B' along the Y' axis due to the squat condition of the vehicle 102. The change may be represented by a value of angular displacement (for example, −25 degree) in the counterclockwise direction, as described, for example, in FIG. 2A. The control system 104 may control movement of the mirror assembly 102A from the first position B' along the Y' axis to the second position C' along the Y" axis by moving the mirror assembly 102A by the offset angle (for example: 25 degree) in the clockwise direction.

In accordance with an embodiment, the control system 104 may communicate the offset with the at least one of the mirror assembly 102A or the seat assembly 102B, the sensor system 106, and a display device (shown in FIG. 3), via an in-vehicle network (shown in FIG. 3). The display device may include a Graphical User interface (GUI) (shown in FIG. 3) that may be configured to render required information to a user (i.e., a driver/occupant of the vehicle). For example, the GUI may render information regarding the offset and the squat condition associated with the vehicle 102.

FIG. 3 is a block diagram that illustrates an exemplary system for squat-responsive mirror and seat control for a vehicle, in accordance with an embodiment of the disclosure. FIG. 3 is explained in conjunction with elements from FIG. 1, FIG. 2A and FIG. 2B. With reference to the FIG. 3, there is shown a block diagram 300 of an exemplary system for adjusting vehicle systems that includes an in-vehicle network 302, control circuitry 304, a stroke sensor 306, cameras 308, a display device 310 and a Graphical User interface (GUI) 310A.

The in-vehicle network 302 may be communicatively coupled to the sensor system 106 and may enable transfer of the sensor information to different electronic components that may be connected to the in-vehicle network 302. The in-vehicle network 302 may include a medium through which the various control units, and/or vehicle systems (for example, the mirror assembly 102A, the seat assembly 102B, the control system 104, the sensor system 106, the display device 310) of the vehicle 102 may communicate with each other. In accordance with an embodiment, the in-vehicle network 302 may exist in the vehicle 102 to connect various devices or components in the vehicle 102, in accordance with various wired and wireless communication protocols. Examples of the wired and wireless communication protocols for the in-vehicle network 302 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The in-vehicle network 302 may be linked with the sensor system 106, which may acquire the sensor information (not shown). The sensor information may be shared with the control circuitry 304 of the control system 104 for further processing. The sensor information may include, for example, data that measures the squat condition of the vehicle 102 (caused by the load 108A on the towed trailer 108 that may be coupled with the vehicle 102) at different time stamps.

The control circuitry 304 may include suitable logic, circuitry, and/or interfaces code that may be configured to execute program instructions associated with different operations to be executed by the control system 104. The control circuitry 304 may include one or more specialized processing units. In an embodiment, such specialized processing units may be implemented as an integrated processor or a cluster of processors that perform the functions of the one or more specialized processing units, collectively. For example, the control circuitry 304 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or process data. Examples of the control circuitry 304 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The sensor system 106 may be configured to acquire the sensor information which may be indicative of the squat condition of the vehicle 102. By way of example, and not limitation, the sensor information may include a value of angular displacement of the vehicle 102 measured with respect to a plane (not shown) substantially parallel to a road surface (shown in FIG. 2A), or a value of substantially vertical distance between the vehicle 102 and the road surface. In an exemplary embodiment, the value of angular displacement may correspond to a level of squat condition that may be caused by the load 108A on the towed trailer 108. The sensor system 106 may further include the stroke sensor 306 and cameras 308 to capture the sensor information.

The stroke sensor 306 may be disposed on a bed space of the towed trailer 108 of the vehicle 102. The stroke sensor 306 may include suitable logic, circuitry, or interfaces, that may be configured to capture at least one of the value of linear displacement or the value of angular displacement measured with respect to a plane (not shown) substantially parallel to the road surface. The stroke sensor 306 may include a sensing unit, a processing unit, a transceiver unit, and a power unit. The stroke sensor 306 may detect change in an orientation of the mirror assembly 102A or the seat assembly 102B, and the detected changes may be converted into an electric signal. In an example embodiment, the stroke sensor 306 may capture distance in between at least one of the bottom portion of the vehicle 102 or a bottom portion of the towed trailer 108 and the road surface in a load condition and a no-load condition. In another example embodiment, the stroke sensor 306 may capture the angular displacement in between at least one of the bottom portion of the vehicle 102 or the bottom portion of the towed trailer 108 and the road surface in the load condition and the no-load condition. The linear displacement or the angular displacement may correspond to a level of squat condition caused by the load 108A on the towed trailer 108.

The cameras 308 may be installed on at least one of the front portion or the rear portion of the vehicle 102. In a preferred embodiment, one or more cameras may be located on the rear portion of the vehicle 102. The cameras 308 may include suitable logic, circuitry, or interfaces that may be configured to capture images from multiple viewpoints to cover a 360-degree view of the rear portion of the vehicle 102. Example of the cameras 308 may include, but is not limited to, an omnidirectional camera, a panoramic camera, an action camera, a wide-angle camera, a closed-circuit television (CCTV) camera, and/or other image capturing devices with image sensing capability.

In an example embodiment, the cameras 308 may capture images of the towed trailer 108 in the load condition and the no-load condition. The control system 104 may compute, by using the images, the value of linear displacement or the value of angular displacement to determine the level of squat condition. By way of example, and not limitation, the cameras 308 may capture the images of the towed trailer 108, in the no-load condition and the load condition. The control system 104, in the no-load condition, may apply a mathematical operation to extract the value of linear displacement between the bottom portion of the towed trailer 108 with reference to the road surface, (for example, 100 centimeter). Thereafter, the control system 104, in the load condition, may apply the same mathematical operation to extract the value of distance between the bottom portion of the towed trailer 108 with reference to the road surface (for example, 125 centimeter), that may correspond to the squat condition. In accordance with an embodiment, the control system 104 may determine the offset based on the sensor information. In accordance with an embodiment, the offset may be equal to the linear or angular displacement.

The display device 310 may be communicatively coupled with the control system 104 and the sensor system 106. The display device 310 may include suitable logic, circuitry, and interfaces that may be configured to display the offset and the squat condition associated with the vehicle 102. The display device 310 may be realized through several known technologies, such as but not limited to, a Liquid Crystal Display (LCD) display, a Light Emitting Diode (LED)

display, a plasma display, or an Organic LED (OLED) display technology. In accordance with an embodiment, the display device 310 may refer to a display screen of a head mounted device (HMD), a smart-glass device, a see-through display, a projection-based display, an electro-chromic display, or a transparent display. The display device 310 may include the GUI 310A that may be configured to render required information to a user (i.e., a driver/occupant of the vehicle). For example, the GUI 310A may render information regarding the offset and the squat condition associated with the vehicle 102.

In accordance with an embodiment, the vehicle 102 may be detected to be in a towing mode. Based on the sensor information, the control circuitry 304 may detect the mode of the vehicle 102 as the towing mode. By way of example, and not limitation, the sensor system 106 may receive the sensor information that may include at least one of the no-load condition (which may correspond to a no-squat or negligible squat condition) and the load condition (which may correspond to a squat condition) of the towed trailer 108. Based on the sensor information, the control system 104 may determine the offset and may control a movement of at least one of the mirror assembly 102A or the seat assembly 102B of the vehicle 102. The control circuitry 304 may further control the display device 310 associated with the vehicle 102, to render the offset and the squat condition associated with the vehicle 102 on the GUI 310A.

The GUI 310A may include a prompt overlay with an option to lock the movement of the mirror assembly 102A or the seat assembly 102B, before the movement of the mirror assembly 102A or the seat assembly 102B may be controlled. By way of example, and not limitation, the control circuitry 304 may determine the towing mode based on the sensor information received from the sensor system 106. For example, the stroke sensor 306 may determine the squat in the vehicle 102 due to the load 108A. Moreover, the cameras 308 located on the rear portion of the vehicle 102 may capture multiple images. Based on the images, the control circuitry 304 may determine that the vehicle 102 is in the towing mode. Thereafter, based on the detection of the towing mode, the control circuitry 304 may lock the movement of the mirror assembly 102A or the seat assembly 102B. Furthermore, after the offset is determined by the sensor system 106 based on the sensor information, the control circuitry 304 may be configured to further control the movement of at least one of the mirror assembly 102A or the seat assembly until the effect of the offset on the position or orientation of the mirror assembly 102A or the seat assembly is negated.

The GUI 310A may further include an option to save the offset as a preferred setting associated with the towing mode of the vehicle 102. The GUI 310A may be configured to display the offset determined by the control system 104, while the vehicle 102 is in the towing mode. The user may click on the option to save the offset as the preferred setting. During another trip with the vehicle 102 in the towing mode, the preferred setting may be applied by default to adjust the position of the mirror assembly 102A or the seat assembly 102B.

In a particular trip, the control circuitry 304 may detect the activation of the towing mode of the vehicle 102. Based on the activation of the towing mode, the control circuitry 304 may control the movement of at least one of the mirror assembly 102A or the seat assembly 102B based on the preferred setting associated with the towing mode. With the preferred setting, the control system 104 may be able to save time with unnecessary adjustment of the mirror assembly 102A or the seat assembly 102B when the towing mode is active.

In accordance with an embodiment, a change in the mode of the vehicle 102 may be detected. The control circuitry 304 may detect the change in the mode of the vehicle 102 from the towing mode to an active driving mode that may be different from the towing mode. By way of example, and not limitation, the active driving mode may correspond to one of the drive modes (e.g., sport, comfort, normal, etc.). In the active driving mode, the towed trailer 108 may or may not be coupled to the vehicle 102. Based on the detection of the change in the mode of the vehicle from the towing mode to the active driving mode, the control circuitry may update the offset by which the mirror assembly 102A or the seat assembly 102B is to be moved with reference to the second position. Based on the updated offset, the control circuitry 304 may control the movement of at least one of the mirror assembly 102A or the seat assembly 102B from the second position to a default position which may be different from the second position. If the towed trailer 108 is coupled to the vehicle 102 and the vehicle 102 is in active mode, then the control system 104 may still control the movement of the mirror assembly 102A or the seat assembly 102B to the second position from the first position, as described, in detail, for example in FIG. 2B.

In accordance with another embodiment, the control circuitry 304 may further lock the mirror assembly 102A to the first position while the seat assembly 102B is moved to the second position. In case an adjustment of the seat assembly 102B is required and the adjustment of the mirror assembly 102A is not required, then the control circuitry 304 may be configured to lock the movement of the mirror assembly 102A to the first position and may control the movement of the seat assembly 102B to the second position. In case the adjustment of the mirror assembly 102A is required and the adjustment of the seat assembly 102B is not required, then the control circuitry 304 may be configured to lock the movement of the seat assembly 102B to the first position and control the movement of the mirror assembly 102A to position the mirror assembly 102A to the second position.

In accordance with another embodiment, a user profile may be updated with the offset. The control circuitry 304 may further be configured to update the offset in the user profile associated with the vehicle 102. The user profile may be stored on at least one of a key fob, a cloud server, or a personal computing device. By way of example, but not limitation, the user profile may include information related to the user, such as, but not limited to, a name, an age, a height, or a driving style. The user profile may further store the offset which may include the offset angle or the direction for rotation of the mirror assembly 102A and the seat assembly 102B.

The user may use the key fob or the personal computing device to select the preferred setting that includes the offset to adjust at least one of the mirror assembly 102A or the seat assembly 102B. In case the user has a preferred setting stored in the user profile, then the key fob or the personal computing device may be used to trigger automatic adjustment of the mirror assembly 102A or the seat assembly 102B as per the preferred setting, reducing the chances of the user fighting with the adjustment of the mirror assembly 102A or the seat assembly 102B.

In some situations, the vehicle 102 may be operating on a rough terrain, which may cause a sudden change in the level of squat condition at particular timestamps. For example, the vehicle 102 may cross a speed breaker which may cause the sudden change in a level of squat condition at a particular timestamp. In accordance with embodiment, the control system 104 may receive the sensor information that may include a plurality of levels of the squat condition corresponding to a plurality of timestamps. The control circuitry 304 may be configured to determine a first level of the plurality of levels at a first timestamp of the plurality of timestamps and a second level of the plurality of levels at a second timestamp of the plurality of timestamps. Further, the control circuitry 304 may determine a difference between the first timestamp and the second timestamps. In case the difference between the first timestamp and the second timestamp is below a threshold time, the control circuitry 304 may be configured to skip the determination of the offset and may further skip the control of the movement of at least one the mirror assembly 102A or the seat assembly 102B.

Figure 4:
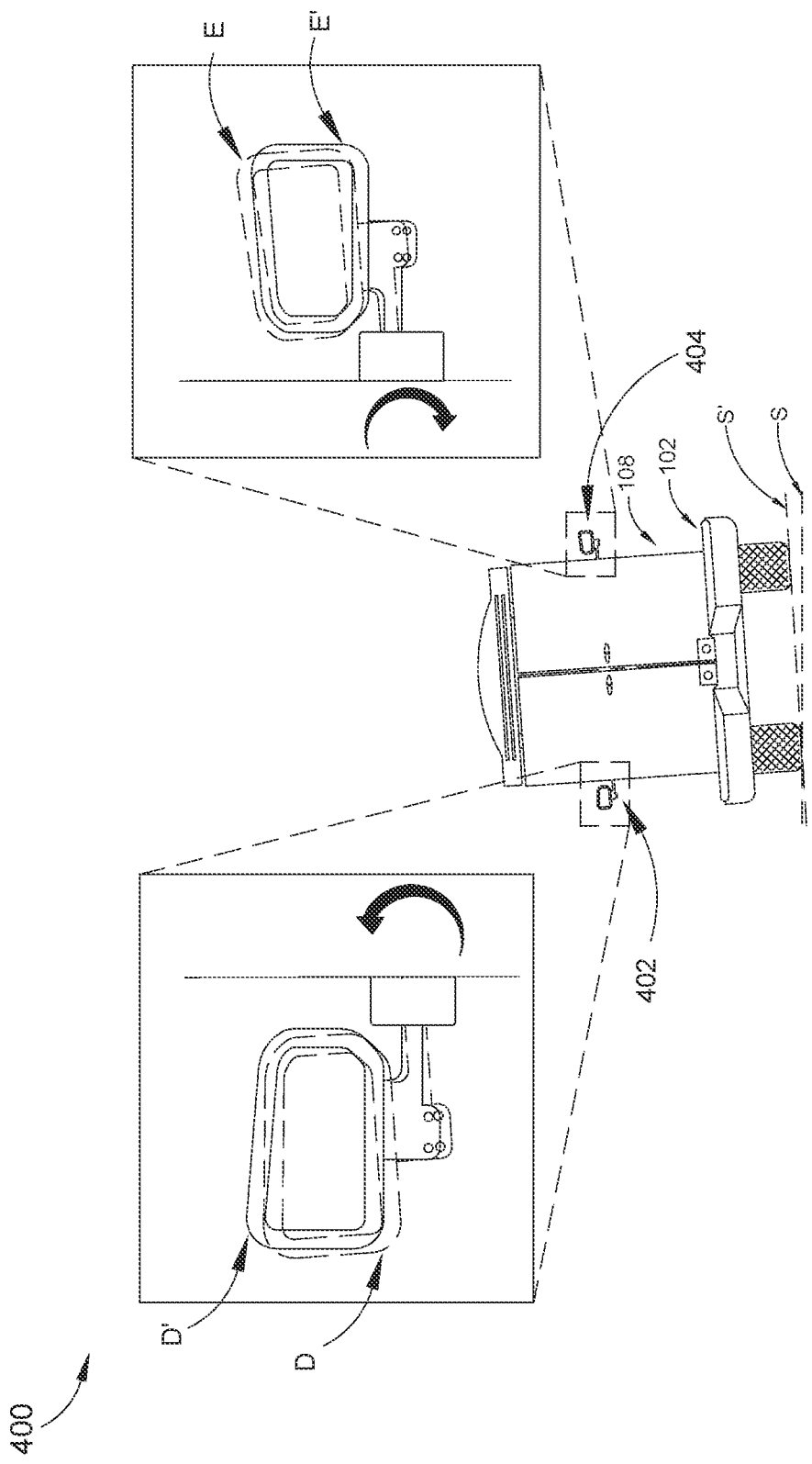
FIG. 4 is a diagram that illustrates an exemplary scenario for adjusting an outside rearview mirror based on detection of a lean in a vehicle, in accordance with an embodiment of the disclosure.

FIG. 4 is a diagram that illustrates an exemplary scenario for adjusting an outside rearview mirror based on a detection of a lean in a vehicle, in accordance with an embodiment of the disclosure. FIG. 4 is explained in conjunction with elements from FIG. 1, FIG. 2A, FIG. 2B and FIG. 3. With reference to FIG. 4, there is shown a scenario diagram 400 for adjusting a mirror assembly associated with the vehicle 102 that may be attached to the towed trailer 108. The scenario diagram 400 may include the mirror assembly 102A that includes the first outside rearview mirror 402 on a first side of the vehicle 102 and the second outside rearview mirror 404 on the second side of the vehicle 102. By way of example, and not limitation, the first side of the vehicle 102 may correspond to a left side of the vehicle 102 and the second side of the vehicle 102 may correspond to a right side of the vehicle 102.

Based on the determined offset, each of the first outside rearview mirror 402 and the second outside rearview mirror 404 may be moved by the offset angle in a direction that is opposite to the direction of rotation (specified in the offset). The direction of rotation may be measured with respect to a plane substantially parallel to the rear portion of the vehicle 102.

In accordance with an embodiment, the control circuitry 304 may detect a lean in the vehicle 102 based on the sensor information. The sensor system 106 may detect the lean in the vehicle 102 while taking a turn, caused due to banking of a road around the turn. Further, the vehicle 102 may include a pair of wheels, that may be aligned in a horizontal plane which may be substantially parallel to a road surface, along S axis. When the vehicle 102 leans around the turn, the pair of wheels may be aligned along a S' axis which may be different from the S axis. The S axis may be shifted to the S' axis due to the banking of the road.

The sensor system 106 may receive the sensor information that may include a level of the squat condition on the first side and the second side of the vehicle 102. By way of example, but not limitation, the first side of the vehicle 102 may have a level of squat condition (for example, 50 centimeter), which may be different from the level of squat condition (for example, 150 centimeter) on the second side of the vehicle 102. Based on the different levels of squat condition, the control circuitry 304 may receive different values of angular displacement for the first outside rearview mirror 402 and the second outside rearview mirror 404. The value of angular displacement for the first outside rearview mirror 402 (for example, −20 degree) may be different from the value of angular displacement for the second outside rearview mirror 404 (for example, 30 degree), while the vehicle 102 leans around a turn. Further, in a lean condition, the first outside rearview mirror 402 may be at a first position D and the second outside rearview mirror 404 may be at a first position E.

Based on the detection of the lean, the control circuitry 304 may determine a different value of the offset for each of the first outside rearview mirror 402 and the second outside rearview mirror 404. The offset may include a first offset angle for the first outside rearview mirror 402 and a second offset angle for the second outside rearview mirror 404. The first offset angle (for example, 20 degree) may be different from the second offset (for example, −30 degrees). Thereafter, the control system 104 may control the movement of the first outside rearview mirror 402 and the second outside rearview mirror 404. Specifically, the first outside rearview mirror 402 may be adjusted from the first position D to a second position D' which may be different from the first position D. The first outside rearview mirror 402 may be placed in the second position D' by moving the first outside rearview mirror 402 by the first offset angle (for example, 20 degree) in the clockwise direction with respect to the back portion of the vehicle 102. Similarly, the second outside rearview mirror 404 may be adjusted from the first position E to a second position E' which may be different from the first position E. The second outside rearview mirror 404 may be placed in the second position E' by moving the second outside rearview mirror 404 by the second offset angle (for example, 30 degree) in the counterclockwise direction with respect to the back portion of the vehicle 102.

Figure 5:
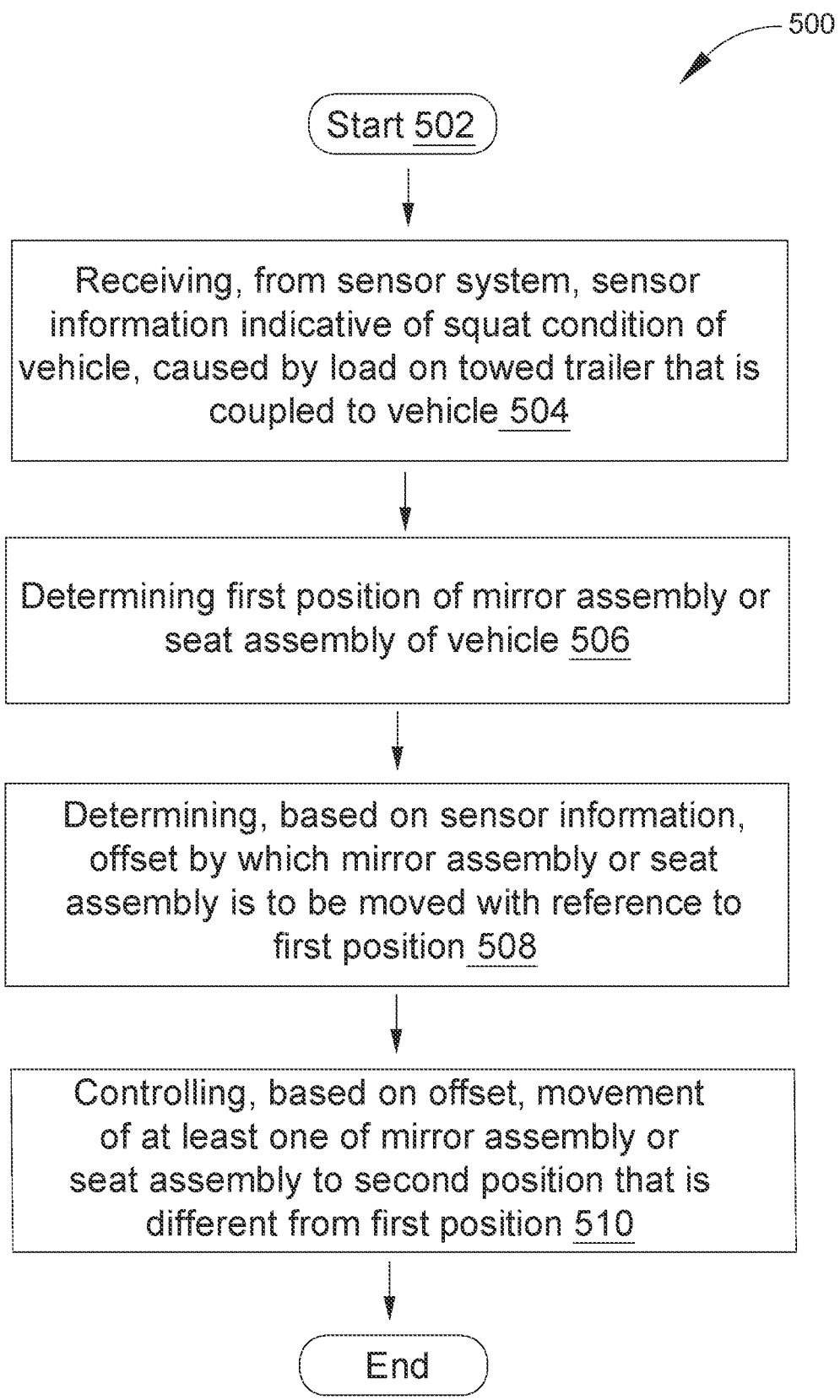
FIG. 5 is a flowchart that illustrates an exemplary method of squat-responsive mirror and seat control for a vehicle, in accordance with an embodiment of the disclosure.

FIG. 5 is a flowchart that illustrates an exemplary method of squat-responsive mirror and seat control for a vehicle, in accordance with an embodiment of the disclosure. FIG. 5 is explained in conjunction with elements from FIG. 1, FIG. 2A, FIG. 2B, FIG. 3, and FIG. 4. With reference to FIG. 5, there is shown a flowchart 500, which may depict exemplary operations that are performed by an exemplary system, such as the control system 104 of FIG. 1 or any suitable system, apparatus, or device, such as the control circuitry 304. The method illustrated in the flowchart 500 may start at 502 and proceed to 504.

At 504, sensor information may be received. In one or more embodiments, the control circuitry 304 may receive the sensor information which may be indicative of the squat condition of the vehicle 102, caused by the load 108A on the towed trailer 108 that may be coupled to the vehicle 102, as further described, for example, in FIG. 1, FIG. 2A, and FIG. 2B.

At 506, a first position may be determined based on the sensor information. In one or more embodiments, the control circuitry 304 may determine the first position of the mirror assembly 102A and the seat assembly 102B of the vehicle 102, as further described, for example, in FIG. 2A, and FIG. 2B.

At 508, an offset may be determined based on the sensor information. In one or more embodiments, the control circuitry 304 may determine the offset by which the mirror assembly 102A or the seat assembly 102B may be moved with reference to the first position, as described, for example, in FIG. 1, FIG. 2A, FIG. 2B, FIG. 3 and FIG. 4.

At 510, a movement may be controlled based on the offset. In one or more embodiments, the control circuitry 304 may control the movement of at least one of the mirror assembly 102A or the seat assembly 102B to a second position that may be different from the first position, as described, for example, in FIG. 2A, FIG. 2B, FIG. 3, and FIG. 4. Control may pass to end.

Although the flowchart 500 is illustrated as discrete operations, such as 502, 504, 506, 508, and 510 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of computer-executable instructions executable by the control system 104 associated with the vehicle 102. The set of instructions may be executable by the control system 104 to perform operations that may include receiving from a sensor system of the vehicle 102, sensor information indicative of a squat condition of the vehicle 102, caused by the load 108A on the towed trailer 108 that may be coupled to the vehicle 102. The operations may further include determining a first position of the mirror assembly 102A or the seat assembly 102B of the vehicle 102. The operations may further include determining, based on the sensor information, an offset by which the mirror assembly 102A or the seat assembly 102B is to be moved with reference to the first position. The operations may further include controlling, based on the offset, a movement of at least one of the mirror assembly 102A or the seat assembly 102B to a second position that is different from the first position.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

What is claimed is:

1. A system, comprising:
control circuitry that is communicatively coupled to a sensor system of a vehicle:
receives, from the sensor system, sensor information indicative of a squat condition of the vehicle, caused by a load on a towed trailer that is coupled to the vehicle;
determines a first position of a mirror assembly or a seat assembly of the vehicle;
determines, based on the sensor information, an offset by which the mirror assembly or the seat assembly is to be moved with reference to the first position; and
controls, based on the offset, a movement of at least one of the mirror assembly or the seat assembly to a second position that is different from the first position,
wherein the sensor information includes a plurality of levels of the squat condition corresponding to a plurality of timestamps, and wherein the control circuitry further:
determines a first level of the plurality of levels at a first timestamp of the plurality of timestamps and a second level of the plurality of levels at a second timestamp of the plurality of timestamps; and
skips the determination of the offset and the control of the movement based on a determination that a difference between the first timestamp and the second timestamp is below a threshold time.

2. The system according to claim 1, wherein the sensor system comprises at least one of:
a stroke sensor disposed on a bed space of the towed trailer; and
one or more cameras located on a rear portion of the vehicle.

3. The system according to claim 1, wherein the control circuitry further updates the offset in a user profile associated with the vehicle, and the user profile is stored on at least one of a key fob, a cloud server, or a personal computing device.

4. The system according to claim 1, wherein the offset includes an offset angle and a direction of rotation as one of a clockwise direction or a counterclockwise direction.

5. The system according to claim 4, wherein the offset angle is equal to a value of angular displacement included in the sensor information, and the value of angular displacement corresponds to a level of the squat condition that is caused by the load on the towed trailer.

6. The system according to claim 4, wherein the mirror assembly comprises a first outside rearview mirror on a first side of the vehicle and a second outside rearview mirror on a second side of the vehicle, and wherein each of the first outside rearview mirror and the second outside rearview mirror is moved by the offset angle in the counterclockwise direction based on the determined offset.

7. The system according to claim 6, wherein the control circuitry further detects a lean in the vehicle based on the sensor information,
wherein the offset is determined further based on the detection of the lean and includes a first offset angle for the first outside rearview mirror and a second offset angle for the second outside rearview mirror, and the first offset angle is different from the second offset angle.

8. The system according to claim 1, wherein the control circuitry further:
    detects a mode of the vehicle as a towing mode; and
    controls a display device associated with the vehicle based on the detection to render the offset and the squat condition associated with the vehicle on a Graphical User Interface (GUI).

9. The system according to claim 8, wherein the GUI comprises a prompt overlay with an option to lock the movement of the mirror assembly or the seat assembly before the movement of the mirror assembly or the seat assembly is controlled.

10. The system according to claim 8, wherein the GUI further comprises an option to save the offset as a preferred setting associated with a towing mode of the vehicle, and wherein the control circuitry further:
    detects an activation of the towing mode of the vehicle; and
    controls the movement of at least one of the mirror assembly or the seat assembly further based on the activation of the towing mode and the preferred setting associated with the towing mode.

11. The system according to claim 1, wherein the control circuitry further:
    detects a change in a mode of the vehicle from a towing mode to an active driving mode that is different from the towing mode;
    updates the offset based on the detection of the change; and
    controls the movement of at least one of the mirror assembly or the seat assembly from the second position to the first position based on the updated offset.

12. The system according to claim 1, wherein the control circuitry further locks the mirror assembly to the first position while the seat assembly is moved to the second position.

13. The system according to claim 1, wherein the control circuitry further locks the seat assembly to the first position while the mirror assembly is moved to the second position.

14. A method, comprising:
    in a system that includes control circuitry communicatively coupled to a sensor system of a vehicle:
        receiving, from the sensor system, sensor information indicative of a squat condition of the vehicle, caused by a load on a towed trailer that is coupled to the vehicle;
        determining a first position of a mirror assembly or a seat assembly of the vehicle;
        determining, based on the sensor information, an offset by which the mirror assembly or the seat assembly is to be moved with reference to the first position;
        controlling, based on the offset, a movement of at least one of the mirror assembly or the seat assembly to a second position that is different from the first position; and
        controlling a display device associated with the vehicle to render the offset and the squat condition associated with the vehicle on a Graphical User Interface (GUI), wherein the GUI comprises a prompt overlay with an option to lock the movement of the mirror assembly or the seat assembly before the movement of the mirror assembly or the seat assembly is controlled.

15. The method according to claim 14, wherein the sensor system comprises at least one of:
    a sensor disposed on a bed space of the towed trailer; and
    one or more cameras located on a rear portion of the vehicle.

16. The method according to claim 14, further comprising updating the offset in a user profile associated with the vehicle, wherein the user profile is stored on at least one of a key fob, a cloud server, or a personal computing device.

17. The method according to claim 14, wherein the offset includes an offset angle and a direction of rotation as one of a clockwise direction or a counterclockwise direction.

18. The method according to claim 17, wherein the mirror assembly comprises a first outside rearview mirror on a first side of the vehicle and a second outside rearview mirror on a second side of the vehicle, and
    wherein each of the first outside rearview mirror and the second outside rearview mirror is moved by the offset angle in the counterclockwise direction based on the determined offset.

19. A non-transitory computer-readable medium having stored thereon, computer-executable instructions which, when executed by a system for a vehicle, cause the system to execute operations, the operations comprising:
    receiving, from a sensor system of the vehicle, sensor information indicative of a squat condition of the vehicle, caused by a load on a towed trailer that is coupled to the vehicle;
    determining a first position of a mirror assembly or a seat assembly of the vehicle;
    determining, based on the sensor information, an offset by which the mirror assembly or the seat assembly is to be moved with reference to the first position;
    controlling, based on the offset, a movement of at least one of the mirror assembly or the seat assembly to a second position that is different from the first position; and
    detecting a lean in the vehicle based on the sensor information, wherein the mirror assembly comprises a first rearview mirror on a first side of the vehicle and a second rearview mirror on a second side of the vehicle, and wherein the offset is determined further based on the detection of the lean and includes a first offset angle for the first rearview mirror and a second offset angle for the second rearview mirror, and the first offset angle is different from the second offset angle.

20. The non-transitory computer-readable medium according to claim 19, wherein the sensor information includes a plurality of levels of the squat condition corresponding to a plurality of timestamps, and wherein the operations further comprising:
    determining a first level of the plurality of levels at a first timestamp of the plurality of timestamps and a second level of the plurality of levels at a second timestamp of the plurality of timestamps; and
    skipping the determination of the offset and the control of the movement based on a determination that a difference between the first timestamp and the second timestamp is below a threshold time.

\* \* \* \* \*